Oct. 23, 1962 P. P. THOMAS 3,059,951
SLIDING BALL JOINT ASSEMBLY
Filed Jan. 16, 1959 2 Sheets-Sheet 1
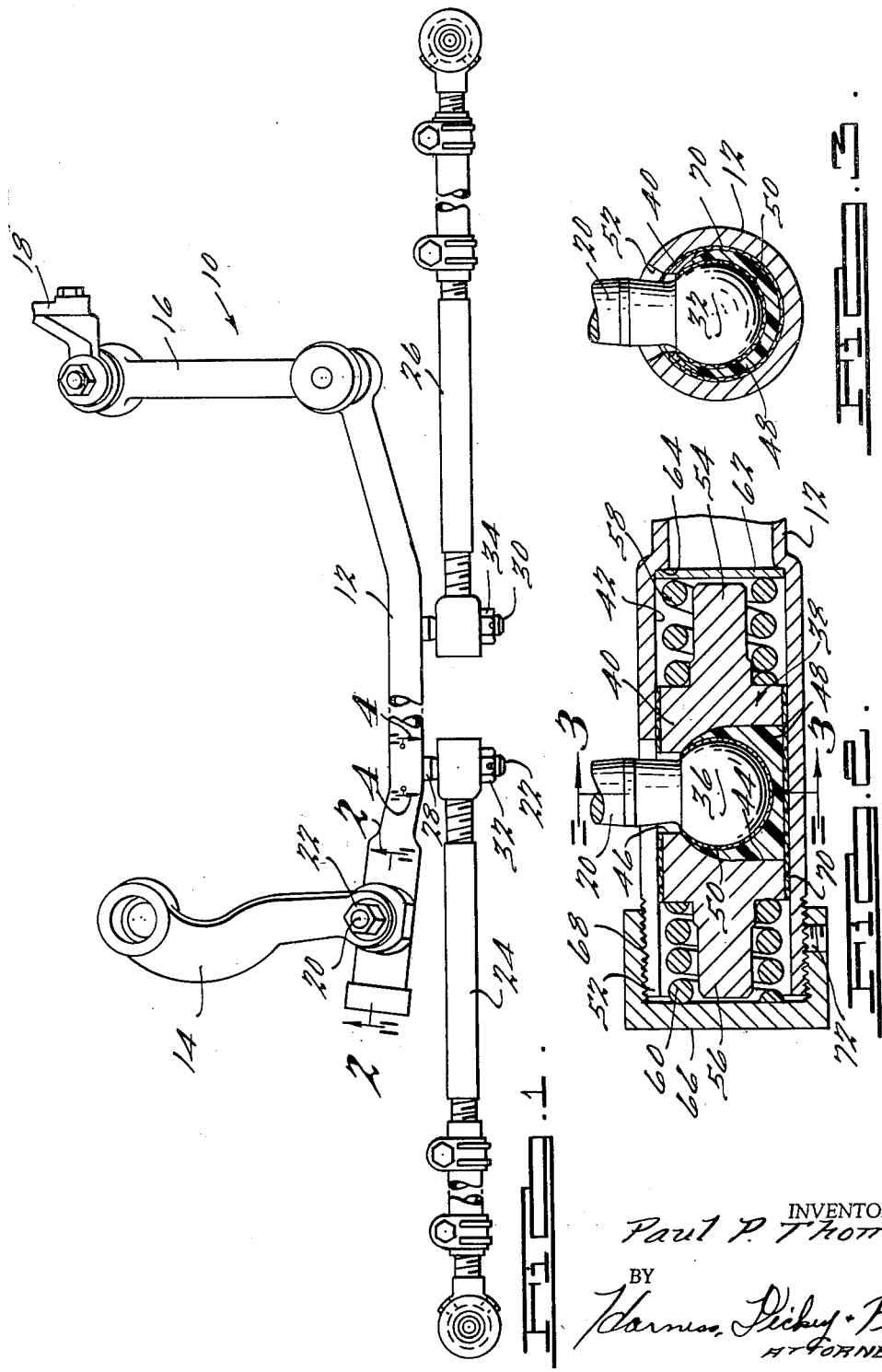
INVENTOR.
Paul P. Thomas.
BY
Harness, Dickey & Pierce
ATTORNEYS Oct. 23, 1962 P. P. THOMAS 3,059,951
SLIDING BALL JOINT ASSEMBLY
Filed Jan. 16, 1959 2 Sheets-Sheet 2
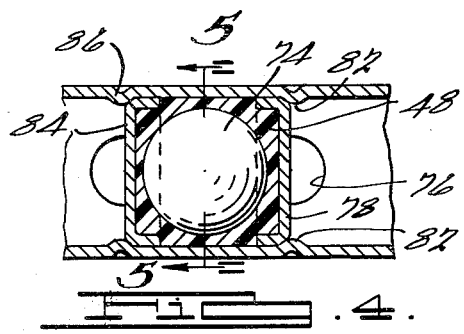
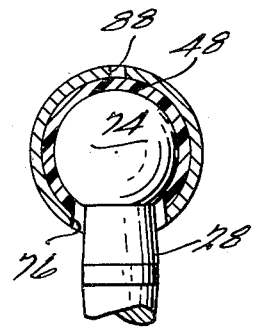
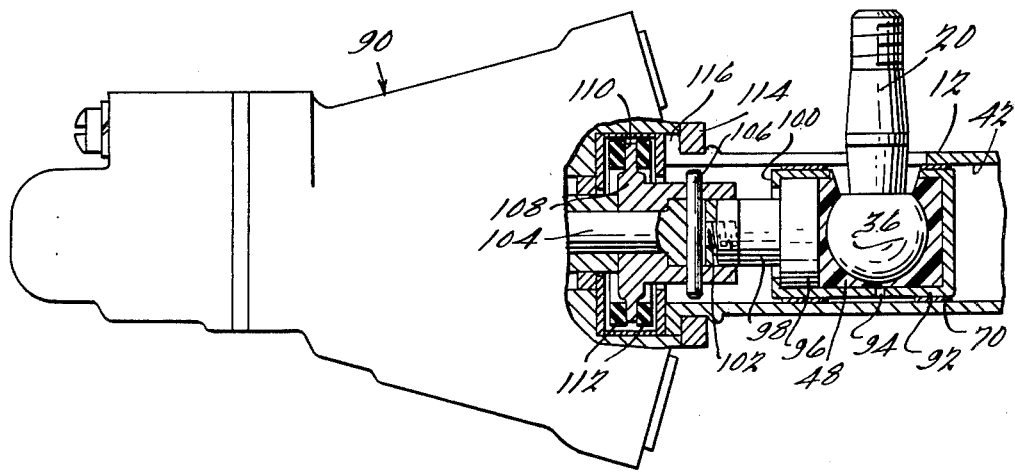
INVENTOR.
Paul P. Thomas
BY
Harness, Dickey & Pierce
ATTORNEYS.

United States Patent Office 3,059,951
Patented Oct. 23, 1962

1

3,059,951
SLIDING BALL JOINT ASSEMBLY
Paul P. Thomas, Detroit, Mich., assignor to American Metal Products Company, Detroit, Mich., a corporation of Michigan
Filed Jan. 16, 1959, Ser. No. 787,281
6 Claims. (Cl. 287—90)

This invention relates to ball joint assemblies and particularly to a ball joint assembly that can be slidably mounted in a member, such as a connecting link of a vehicle steering linkage system, for limited linear movement as well as universal movement relative thereto.

In order to reduce the transmission of road shocks from the steering linkages of vehicles to the pitman arm and thence to the steering wheel of the automobile where they are felt by the driver, the ball joint connecting the pitman arm to the connecting link is sometimes journaled in the connecting link in a resilient manner so that the road shocks are dampened rather than being transmitted directly through the ball joint connection. It has further been the practice to use such a ball joint assembly resiliently journaled in the connecting link for limited axial movement relative thereto for actuating a power steering control mechanism mounted on the end of the connecting link.

It is one object of the invention to provide a ball joint assembly that can be used in the above-described applications and which does not require lubrication and can be sealed for life.

It is another object of the invention to provide a ball joint assembly having a housing adapted to be slidably mounted in a member.

It is a further object of the present invention to provide a ball joint that can have a housing molded thereabout which can be inserted within a member for limited axial movement relative thereto.

It is a still further object of the invention to provide a housing for journaling the ball of a stud and ball for limited universal movement with the housing being adapted to be slidably mounted in a connecting link of a vehicle steering linkage system in a resilient manner to dampen vibration between the stud and the connecting link.

It is a still further object of the invention to provide a ball joint assembly that can be slidably mounted in a tubular member and operatively connected to a power steering control mechanism in a manner to enable the forces applied to the stud to actuate said mechanism.

It is a further object of the present invention to journal the ball of a stud and ball in a tubular connecting link by a hardenable material molded around the ball, a portion of the tubular connecting link serving as a housing or die for confining the hardenable material.

It is a further object of the present invention to provide a method for journaling the ball of a stud and ball intermediate the end of a piece of tubing which includes the steps of inserting the stud and ball into the end of the tubing, feeding the stud downwardly through an aperture in the wall of the tubing intermediate the ends thereof, and injecting hardenable material within the tubing and about the ball to journal the ball for limited universal movement relative to the tubular member.

It is a still further object of the invention to provide a relatively simple ball joint construction for journaling the ball of a stud and ball in a tubular member in a relatively simple, economical and rugged manner.

Other objects and features of novelty of the invention will be specifically pointed out or otherwise become apparent when referring, for a better understanding of the invention to the following description taken in conjunction with the accompanying drawings, wherein:

2

FIGURE 1 is a broken plan view of a steering linkage system for an automotive vehicle;
FIG. 2 is an enlarged sectional view, taken along the line 2—2 of FIG. 1;
FIG. 3 is a sectional view, taken along the line 3—3 of FIG. 2;
FIG. 4 is an enlarged sectional view, taken along the line 4—4 of FIG. 1;
FIG. 5 is a sectional view, taken along the line 5—5 of FIG. 4; and
FIG. 6 is a view of a modified structure similar to that of FIG. 2 mounted for cooperation with a power steering control mechanism.

Referring to FIG. 1, a vehicle steering linkage system 10 is illustrated which is comprised of the conventional connecting link 12 pivotally supported at one end by a pitman arm 14 and at the other end by an idler arm 16 adapted to be connected to the chassis frame of the vehicle by a bracket 18 or the like, the pitman arm being connectable to the steering mechanism of the vehicle in a conventional manner.

The lower end of the pitman arm 14 is fixed to a stud 20 by a nut 22, a ball on the end of the stud being journaled in the connecting link 12 in a manner to be described. Tie rods 24 and 26 have their inner ends connected to studs 28 and 30 by nuts 32 and 34 with their outer ends adapted for connection to the front wheels of the vehicle in a conventional manner. The studs 28 and 30 also have balls on the ends thereof which are journaled in the connecting link 12 in a manner to be described.

Referring to FIGS. 2 and 3, in accordance with one embodiment of the present invention, ball 36 on the end of the stud 20 is journaled in the tubular connecting link 12 by a housing 38. It will be observed that the housing 38 has a main body portion 40 having the same cross section as the enlarged bore 42 in the end of the tubular connecting link 12 with reduced cylindrical portions 54 and 56 on each end thereof. A transverse cavity 44 is formed in the body portion 40 opening on one side thereof and having a reduced throat aperture 46 opening on the other side thereof. The ball 36 is disposed within the chamber 44 with the stud 20 projecting through the throat aperture 46 and is journaled in the cavity 44 by a hardenable material 48 which completely fills the chamber and accurately conforms to the surface of the ball 36 in a manner to firmly journal the ball in the housing 38 after it hardens.

The hardenable material 48 can be any suitable material such as a plastic or resin material, for example, which can be molded to the ball 36 in the manner described and which is sufficiently rigid and durable after hardening to withstand the loads which are encountered in use. Examples of particular hardenable materials and the manner in which they journal the ball in a housing are completely described and claimed in a copending application of Paul P. Thomas, Serial No. 680,293, filed on August 26, 1957, and assigned to the assignee of the present invention. If desired, a layer of low friction material 50, such as a layer of Teflon cloth as illustrated in Patent No. 2,804,886 to Charles S. White, may be disposed about the ball 36 before the hardenable material 48 is molded thereabout so that the layer of low friction material 50 is accurately conformed to the ball by the hardenable material to reduce the friction between the hardenable material and the ball.

The ball 36 is preferably journaled within the housing 38 as a separate assembly and the housing thereafter slidably disposed within the bore 42, a longitudinally extending slot 52 having a width slightly greater than the diameter of the stud 20 but less than the diameter of the ball 36 being provided in the end of the connecting link 12 to enable the stud to extend therethrough as the housing is being inserted within the bore 42 in this manner. Springs 58 and 60 are disposed about each of the cylindrical projections 54 and 56 with one of the ends thereof bearing against the body 40 and the other ends thereof bearing against a disc 62 and the inner face of a cap nut respectively. The disc 62 seats against a shoulder 64 at the right end of the bore 42 and the cap nut 66 is screwed onto the externally threaded end 68 of the connecting link 12.

With this construction, the cap nut 66 can be screwed onto the connecting link until the entire assembly is locked up tight with the cylindrical projections 54 and 56 abutting against the disc 62 and the inside face of the cap nut 66, respectively, and the springs 58 and 60 compressed their maximum amount. The cap nut may then be backed off a predetermined amount to free the housing 38 for limited longitudinal movement within the bore 42, the movement being limited by the spaces illustrated in FIG. 2 between the ends of the cylindrical projections and the members which they abut against. The springs 58 and 60 will, of course, resiliently resist this longitudinal movement and thus will serve to dampen the vibrations which normally are transmitted from the connecting link 12 to the pitman arm 14 and thence to the steering wheel of the vehicle where they are felt by the driver. If desired, a layer of low friction material 70 may be disposed about the body portion 40 of the housing 38 to reduce the friction between the body and the wall of the bore 42, and a set screw 72 or the like may be provided to lock the end cap 66 after it has been backed off as previously described.

Referring to FIGS. 4 and 5, ball 74 on the end of the stud 28 to which the tie rod 24 is connected may also be journaled in the tubular connecting link 12 by the hardenable material 48 in an extremely simple and economical manner with the connecting link serving as a portion of the housing in which the hardenable material is molded and wherein the width of a slot 76 through which the stud 28 projects is less than the diameter of the ball 74. In prior art structures, a portion of the slot 76 always had to be slightly larger in diameter than the ball 74 to enable the ball to be inserted through the wall of the tubular connecting link 12, which, of course, significantly reduced the strength of the connecting link at this point.

The ball 74 is journalled in the connecting link in this manner by fixing a cup-shaped element 78 in the position illustrated in FIG. 4 so that it completely blocks off the tubular connecting link, the element 78 being fixed in this position by any suitable means such as by spot welding or by crimping portions 82 of the wall of the connecting link, as illustrated in FIG. 4, to prevent movement of the element to the right. With this construction the element 78 can readily be inserted from the left end of the connecting link 12 after which the stud 28 with the ball 74 on the end thereof can be fed into the connecting link 12 until the stud is in position to be dropped or cocked through the slot 76 as illustrated in FIG. 5. With this method of assembly, it is readily apparent that the slot 76 need only be slightly wider than the stud 28 and long enough to permit the stud to be dropped or cocked therethrough as described. A second cup-shaped cap 84 can then be inserted within the connecting link and fixed by crimped portions 86, or the like.

A suitable adapter (not shown) can then be disposed about the stud 28 to completely close off the slot 76 and the hardenable material 48 injected through an aperture 88 provided in the wall of the connecting link so as to completely fill the chamber defined by the inner wall of the connecting link 12 and the end caps 78 and 84. The hardenable material will accurately conform to the surface of the ball, as previously described above and in the aforementioned copending application, and will journal the ball within the connecting link after it hardens.

With this construction, a relatively simple and economical ball joint is formed without weakening the connecting link by providing an aperture therein having a diameter greater than the diameter of the ball as in the prior art. Further, by eliminating the need for this large diameter opening, the area of the opening about the stud 28 which must be sealed off by an adapter prior to injecting the hardenable material through the aperture 88 is reduced. Of course, the ball on the end of the stud 30 which connects the tie rod to the connection link 12 can also be journaled in the connecting link in the same manner, or if desired, conventional split bearings could be used in place of the hardenable material 48 and still take advantage of the teaching of the present invention wherein the slot 76 is narrower than the diameter of the ball 76. Further, as illustrated in FIGS. 4 and 5, it will be observed that the layer of low friction material 50 has not been provided since the hardenable material 48 can itself provide the bearing surface as described in the aforementioned copending application where a somewhat higher break-away force is not objectionable.

Referring to FIG. 6, a modification of the sliding ball joint assembly of the present invention is illustrated cooperatively connected to a power steering control mechanism 90 of the conventional type adapted to be fixed to the end of a connecting link 12 and to be actuated by the sliding movement of the ball joint assembly, the stud 20 of which would be connected to the pitman arm 14 in the manner illustrated in FIG. 1. It is to be understood that the power steering control mechanism 90 forms no part of the present invention and therefore only a portion thereof has been broken away merely to illustrate the manner in which the sliding ball joint assembly is operatively connected thereto.

In the embodiment illustrated in FIG. 6, housing 92 is formed of sheet metal with an aperture 94 provided for injecting the hardenable material 98 as previously described. An enlarged head 96 of an element 98 is fixed to the housing by spun-over portions 100 so that the head 96 forms one side of the housing 92. After the hardenable material has been injected and hardens to journal the ball 36 in the housing, a reduced threaded portion 102 on the left end of the element 98 can be screwed into a threaded aperture in the right end of an actuating element 104 of the power steering mechanism 90.

The element 104 is connected to the power steering mechanism by a pin 106 as illustrated in FIG. 6 which passes through suitable apertures in the element 104 and a bushing 108, the bushing having a flange 110 projecting radially therefrom between two resilient rings 112 to permit the entire assembly to move slightly in either direction by virtue of the resiliency of the rings 112.

The ball joint assembly is then inserted within the end of the connecting link 12 as illustrated in FIG. 6 and the power steering mechanism 90 is secured to the end of the connecting link in any suitable manner such as by an annular portion 114 thereof which fits over a radially projecting annular flange 116 on the end of the connecting link, the portion 114 being suitably secured to the housing of the power steering mechanism 90. As previously described, low friction material 70 may be disposed about the housing 92 so as to provide a low friction surface engaging the inside wall of the tubular connecting link 12 to reduce the friction therebetween.

In operation, when the stud 20 is connected to the pitman arm 14 as illustrated in FIG. 1, turning of the steering wheel of the vehicle in either direction will pivot the pitman arm in a corresponding direction, which, in turn, will urge the housing 92 in one direction or the other. The housing 92, in turn, urges the bushing 108 in a corresponding direction by virtue of its connection thereto by the elements 98 and 104, and the resilient rings 112 will yield to permit limited movement in either direction which movement is picked up by suitable valves within the power steering mechanism 90, which, in turn, actuate the power assisting device which is generally connected to the connecting link and furnishes most of the force necessary for moving the connecting link to turn the wheels of the vehicle. With this construction, the sliding ball joint assembly of the present invention readily lends itself for actuating a conventional power steering control mechanism 90 in a relatively simple, economical and yet rugged manner.

From the foregoing, it will be appreciated that the present invention provides a sliding ball joint having a number of very distinct advantages over prior art constructions. It does not require any lubrication whatsoever, will maintain the desired functional characteristics for the life of the unit, and provides a simple and economical construction for a nonlubricated system. While it will be apparent that the embodiments of the invention herein disclosed are well calculated to fulfill the objects of the invention, it will be appreciated that the invention is susceptible to modification, variation and change without departing from the proper scope or fair meaning of the subjoined claims.

What is claimed is:

1. In a ball joint assembly, a member having a bore therein opening on one end thereof with a slot in the wall thereof communicating with said bore, a one-piece cylindrical housing slidably disposed within said bore and having a cavity therein, a stud having a ball on one end, said ball being smaller than said cavity and disposed therein with the stud projecting through said slot, a hard material in the cavity surrounding the ball to journal said ball against all movement relative to the housing other than swiveling movement, and spring means for resiliently positioning said housing longitudinally in said bore.

2. The invention as defined in claim 1, including a layer of low friction material disposed between said ball and hard material to reduce the friction therebetween, said layer of low friction material being retained against movement relative to the hard material and accurately conformed to the surface of the ball by the hard material.

3. The invention as defined claim 1, including a layer of low friction material disposed between said housing and the wall of said bore to reduce friction therebetween.

4. In a ball joint assembly, a member having a bore therein opening on one end thereof with a slot in the wall thereof communicating with said bore, a one-piece cylindrical housing having a transverse cavity formed therein opening on diametrically opposed portions of the cylindrical surface of said housing, said ball being smaller than and disposed within said cavity with said stud projecting therefrom through said slot, the opening of said cavity surrounding said stud having a diameter less than the major diameter of said ball, the diametrically opposed openings of said cavity having a diameter greater than the major diameter of said ball to enable the ball and the stud to be removed and inserted therethrough, a hard material in the cavity surrounding the ball to journal said ball against all movement relative to the housing other than swiveling movement, and spring means for resiliently positioning said housing longitudinally in said bore.

5. A ball joint assembly for actuating a power steering control mechanism for an automotive vehicle comprising a connecting link having a bore opening on one end thereof and a longitudinally extending slot communicating with said bore, a one-piece cylindrical housing slidably disposed within said bore and having a cavity therein, a stud having a ball on one end, said ball being smaller than said cavity and disposed therein with the stud projecting through said slot, a hard material in the cavity surrounding the ball to journal said ball against all movement relative to the housing other than swiveling movement, a power steering control mechanism mounted on said one end of the connecting link, and means for connecting said housing to said power steering control mechanism and resiliently positioning said housing longitudinally in said bore.

6. In a ball joint assembly, a member having a bore therein with a slot in the wall thereof, a cylindrical housing concentric with and slidably disposed within said bore and having a cavity therein opening on the cylindrical surface of said housing, a stud having a ball on one end, said ball being smaller than said cavity and disposed therein with the stud projecting through said slot, and a hard material in the cavity surrounding the ball to journal the ball against all movement relative to the housing other than swiveling movement, said hard material forming a curved surface contiguous with the cylindrical surface of said housing.

References Cited in the file of this patent

UNITED STATES PATENTS

| 978,091 | Wessel | Dec. 6, 1910 |
| 1,492,376 | Klages | Apr. 29, 1924 |
| 1,628,914 | Ridenour | May 17, 1927 |
| 1,833,932 | Codnum | Dec. 1, 1931 |
| 1,930,676 | Farr | Oct. 17, 1933 |
| 2,885,248 | White | May 5, 1959 |

FOREIGN PATENTS

| 148,733 | Great Britain | Aug. 5, 1920 |
| 795,987 | Great Britain | June 4, 1958 |
| 807,493 | France | Oct. 19, 1936 |
| 552,405 | Great Britain | Apr. 6, 1943 |